(12) United States Patent
Wise et al.

(10) Patent No.: US 11,709,244 B2
(45) Date of Patent: Jul. 25, 2023

(54) NEAR RANGE RADAR

(71) Applicant: Banner Engineering Corp., Minneapolis, MN (US)

(72) Inventors: Ashley Wise, Plymouth, MN (US); Chunmei Kang, Minneapolis, MN (US); Wade Oberpriller, Minneapolis, MN (US)

(73) Assignee: Banner Engineering Corp., Minneapolis, MN (US)

( * ) Notice: Subject to any disclaimer, the term of this patent is extended or adjusted under 35 U.S.C. 154(b) by 64 days.

(21) Appl. No.: 17/036,255

(22) Filed: Sep. 29, 2020

(65) Prior Publication Data
US 2023/0123458 A1   Apr. 20, 2023

Related U.S. Application Data

(60) Provisional application No. 62/924,025, filed on Oct. 21, 2019.

(51) Int. Cl.
  *G01S 13/34*   (2006.01)
  *G01S 7/35*   (2006.01)

(52) U.S. Cl.
  CPC .......... *G01S 13/342* (2013.01); *G01S 13/347* (2013.01); *G01S 7/352* (2013.01)

(58) Field of Classification Search
  CPC ...... G01S 7/356; G01S 7/352; G01S 13/5244; G01S 13/526; G01S 13/53; G01S 13/56
  (Continued)

(56) References Cited

U.S. PATENT DOCUMENTS 5,187,484 A  *  2/1993  Stove ..................... G01S 13/34
                                                        342/200
5,469,745 A  *  11/1995  Twerdochlib ............ G01H 1/14
                                                        73/660
(Continued)

FOREIGN PATENT DOCUMENTS

CN    100338478 C    9/2007
CN    104007430 A    8/2014
(Continued)

OTHER PUBLICATIONS

Chirp A New Radar Technique by Donald Lancaster published Jan. 1965 Electronics World (Year: 1965).*
(Continued)

*Primary Examiner* — Erin F Heard
*Assistant Examiner* — Michael W Justice
(74) *Attorney, Agent, or Firm* — Craige Thompson; Thompson Patent Law; Timothy D. Snowden

(57) ABSTRACT

Apparatus and associated methods relate to enabling a radar system to use different sensing mechanisms to estimate a distance from a target based on different detection zones (e.g., far-field and near-field). In an illustrative example, a curve fitting method may be applied for near-field sensing, and a Fourier transform may be used for far-field sensing. A predetermined set of rules may be applied to select when to use the near-field sensing mechanism and when to use the far-field mechanism. The frequency of a target signal within a beat signal that has less than two sinusoidal cycles may be estimated with improved accuracy. Accordingly, the distance of a target that is within a predetermined distance range (e.g., two meters range for 24 GHz ISM band limitation) may be reliably estimated.

25 Claims, 11 Drawing Sheets

(58) Field of Classification Search
USPC .............................. 342/128, 192, 195, 196
See application file for complete search history.

(56) References Cited

U.S. PATENT DOCUMENTS

| | | | | |
|---|---|---|---|---|
| 5,479,168 | A * | 12/1995 | Johnson | G06J 1/00 |
| | | | | 360/32 |
| 5,638,074 | A * | 6/1997 | Johnson | H04B 14/046 |
| | | | | 341/110 |
| 5,640,161 | A * | 6/1997 | Johnson | H04B 14/046 |
| | | | | 341/122 |
| 5,646,623 | A * | 7/1997 | Walters | G01S 13/32 |
| | | | | 342/112 |
| 5,808,574 | A * | 9/1998 | Johnson | G06J 1/00 |
| | | | | 341/110 |
| 5,838,274 | A * | 11/1998 | Johnson | G06J 1/00 |
| | | | | 341/110 |
| 5,854,600 | A * | 12/1998 | Johnson | G06J 1/00 |
| | | | | 341/110 |
| 5,864,311 | A * | 1/1999 | Johnson | H03M 5/04 |
| | | | | 341/110 |
| 5,872,531 | A * | 2/1999 | Johnson | H03M 5/04 |
| | | | | 341/110 |
| 7,162,392 | B2 | 1/2007 | Vock et al. | |
| 7,286,599 | B1 * | 10/2007 | Cheah | H04B 1/71632 |
| | | | | 370/212 |
| 7,339,518 | B2 * | 3/2008 | Natsume | G01S 13/345 |
| | | | | 342/111 |
| 7,379,013 | B2 | 5/2008 | Dean et al. | |
| 7,612,707 | B2 * | 11/2009 | Wise | G01S 7/414 |
| | | | | 342/91 |
| 7,630,465 | B2 * | 12/2009 | Nieto | H04L 25/0232 |
| | | | | 455/434 |
| 7,659,847 | B2 | 2/2010 | Bausov et al. | |
| 8,232,907 | B2 * | 7/2012 | Aarseth | G01S 13/904 |
| | | | | 342/25 R |
| 8,401,735 | B2 * | 3/2013 | Muragishi | G05D 19/02 |
| | | | | 267/136 |
| 8,499,016 | B2 | 7/2013 | Szajnowski | |
| 8,504,239 | B2 * | 8/2013 | Muragishi | F16F 7/1005 |
| | | | | 267/136 |
| 8,550,998 | B2 * | 10/2013 | Angelsen | G01S 7/52077 |
| | | | | 600/437 |
| 8,626,386 | B2 * | 1/2014 | Muragishi | G05D 19/02 |
| | | | | 701/37 |
| 8,693,699 | B2 * | 4/2014 | Fellers | G10K 11/17885 |
| | | | | 381/71.1 |
| 8,818,625 | B2 * | 8/2014 | Muragishi | F16F 7/1005 |
| | | | | 701/111 |
| 8,847,815 | B2 * | 9/2014 | Kanamoto | G01S 13/584 |
| | | | | 342/146 |
| 8,866,668 | B2 | 10/2014 | Kitagawa | |
| 8,892,338 | B2 * | 11/2014 | Muragishi | G05D 19/02 |
| | | | | 701/111 |
| 9,194,947 | B1 * | 11/2015 | Mohamed | G01S 13/28 |
| 9,239,372 | B2 * | 1/2016 | Maalouli | G01S 7/4004 |
| 9,452,319 | B2 | 9/2016 | Molyneux et al. | |
| 9,614,279 | B2 * | 4/2017 | McDevitt | H01Q 3/267 |
| 9,702,967 | B2 * | 7/2017 | Luebbert | G01S 13/34 |
| 9,970,756 | B2 * | 5/2018 | Kreitinger | G01N 21/39 |
| 10,042,037 | B2 * | 8/2018 | Chrabieh | G01S 11/02 |
| 10,514,453 | B2 * | 12/2019 | Hesse | G01S 13/931 |
| 10,539,652 | B2 * | 1/2020 | Chrabieh | G01S 5/0252 |
| 10,649,074 | B2 * | 5/2020 | Nakabayashi | G01S 7/35 |
| 10,688,974 | B2 * | 6/2020 | Kim | B60T 7/22 |
| 10,746,851 | B2 * | 8/2020 | Eswaran | G01S 13/343 |
| 10,794,991 | B2 * | 10/2020 | Longman | G01S 7/352 |
| 11,079,467 | B2 * | 8/2021 | Chrabieh | G01S 5/0215 |
| 11,105,890 | B2 * | 8/2021 | Behrens | G01S 7/023 |
| 11,150,356 | B2 * | 10/2021 | Whitworth | G01S 19/23 |
| 2006/0047213 | A1 * | 3/2006 | Gavriely | A61B 5/0205 |
| | | | | 600/528 |
| 2006/0109919 | A1 * | 5/2006 | Nieto | H04L 25/0232 |
| | | | | 375/346 |
| 2006/0181448 | A1 * | 8/2006 | Natsume | G01S 7/36 |
| | | | | 342/111 |
| 2008/0218400 | A1 | 9/2008 | Stolarczyk et al. | |
| 2008/0246650 | A1 | 10/2008 | Teshirogi et al. | |
| 2009/0085797 | A1 * | 4/2009 | Wise | G01S 7/414 |
| | | | | 342/189 |
| 2009/0178483 | A1 * | 7/2009 | Angelsen | G01S 7/52022 |
| | | | | 73/597 |
| 2010/0036244 | A1 * | 2/2010 | Angelsen | G01S 7/52077 |
| | | | | 600/438 |
| 2010/0155609 | A1 * | 6/2010 | Silva | G02B 5/1876 |
| | | | | 250/363.06 |
| 2011/0142247 | A1 * | 6/2011 | Fellers | G10K 11/17827 |
| | | | | 381/71.1 |
| 2012/0193847 | A1 * | 8/2012 | Muragishi | F16F 7/1005 |
| | | | | 267/140.14 |
| 2012/0197490 | A1 * | 8/2012 | Muragishi | F16F 15/002 |
| | | | | 701/37 |
| 2012/0197491 | A1 * | 8/2012 | Muragishi | B60G 17/018 |
| | | | | 701/37 |
| 2012/0217108 | A1 * | 8/2012 | Muragishi | F16F 7/1005 |
| | | | | 188/379 |
| 2014/0070983 | A1 * | 3/2014 | Maalouli | G01S 7/4004 |
| | | | | 342/192 |
| 2015/0331098 | A1 * | 11/2015 | Luebbert | G01S 7/354 |
| | | | | 342/91 |
| 2016/0043465 | A1 * | 2/2016 | McDevitt | G01S 13/91 |
| | | | | 342/368 |
| 2016/0306027 | A1 * | 10/2016 | Chrabieh | G01S 5/06 |
| 2017/0097302 | A1 * | 4/2017 | Kreitinger | G01M 3/28 |
| 2017/0146646 | A1 * | 5/2017 | Nakabayashi | G01S 13/34 |
| 2017/0176574 | A1 * | 6/2017 | Eswaran | G01S 7/4008 |
| 2018/0011181 | A1 * | 1/2018 | Urakawa | G01S 13/343 |
| 2018/0031688 | A1 * | 2/2018 | Hesse | G01S 7/4008 |
| 2018/0188379 | A1 * | 7/2018 | Whitworth | G01S 19/21 |
| 2018/0313930 | A1 * | 11/2018 | Chrabieh | G01S 11/02 |
| 2019/0126893 | A1 * | 5/2019 | Kim | G01S 13/42 |
| 2019/0137602 | A1 * | 5/2019 | Longman | G01S 7/352 |
| 2019/0187246 | A1 * | 6/2019 | Behrens | G01S 13/36 |
| 2020/0103491 | A1 * | 4/2020 | Chrabieh | G01S 11/02 |
| 2020/0241139 | A1 * | 7/2020 | Roos | G01S 17/931 |

FOREIGN PATENT DOCUMENTS

| | | |
|---|---|---|
| JP | 2006017651 A | 1/2006 |
| JP | 2015179035 A | 10/2015 |
| WO | 2017223299 A1 | 12/2017 |

OTHER PUBLICATIONS

An interpolation method using signal recovery and discrete Fourier Transform by Chien-Min Kao published IEEE (Year: 1999).*

Noise Reduction and Interpolation by Jorge Slavador Marques at Instituto Superior Tecnico (Year: 2009).*

Agrez, D., "Sine-wave parameter estimation in the shortened measurement time using DC DFT coefficient," 2016 IEEE International Instrumentation and Measurement Technology Conference Proceedings, May 23-26, 2016, accessed Aug. 29, 2019, https://ieeexplore.ieee.org/document/7520594/authors#authors.

Bilau, et al., "Algorithm and Convergence of the Four-Parameter Sine Fitting," Budapest University of Technology and Economics, retrieved from the internet, http://home.mit.bme.hu/~ztbilau/publications/TDK_2002_Paper.pdf.

Fenn, A.J., "Near-Field Testing of Adaptive Radar Systems," Nov. 1, 1990, vol. 3, The Lincoln Laboratory Journal, 18 pages.

Gu, C, "Short-Range noncontact Sensors for Healthcare and Other Emerging Applications: A Review," Google, Inc., Mountain View, CA, 24 pages.

Han, et al., "Neural networks for sinusoidal frequency estimation," Journal of the Franklin Institute, vol. 334, Issue 1, Jan. 1997, https://www.sciencedirect.com/science/article/abs/pii/S0016003296000798?via%3Dihub.

Handel, P., "Properties of the IEEE-STD-1057 four-parameter sine wave fit algorithm," IEEE Transactions on Instrumentation and Measurement, vol. 49, Issue 6, Dec. 2000, https://www.researchgate.

(56) References Cited

OTHER PUBLICATIONS net/publication/3089839_Properties_of_the_IEEE-STD-1057_four-parameter_sine_wave_fit_algorithm.

Infineon, "BGT24MTR11 Silicon Germanium 24 GHz Transceiver MMIC," Data Sheet, 27 pages, https://www.infineon.com/dgdl/Infineon-BGT24MTR11-DS-v03_01-EN.pdf?fileId=db3a304339dcf4b10139def491930214.

Infineon, "Position2Go software user manual," 39 pages, https://www.infineon.com/dgdl/Infineon-P2G_Software_User_Manual-User_Manual-v01_01-EN.pdf?fileId=5546d4627762291e017769040a233324.

Izacard, et al, "Data-driven Estimation of Sinusoid Frequencies," Feb. 3, 2021, https://arxiv.org/pdf/1906.00823.pdf.

Max, Solomon, "Four Parameter Sine Fit With Less Than One Cycle of Data," Technology Conference, May 20-22, 2003, Vail, CO, 6 pages.

OEM Off-Highway, "PRECO PreView Sentry Object Detection System," PRECO Electronics, Sep. 26, 2016, https://www.oemoffhighway.com/electronics/sensors/proximity-detection-safety-systems/asset-management-safety-systems/product/12261125/preco-electronics-inc-preco-preview-sentry-object-detection-system.

PRECO Electronics, "PreView Radar Systems, PreView Sentry®X SX97Sensor Operating Manual," aps-supply.com, 17 pages, https://www.aps-supply.com/wp-content/uploads/2020/07/PREV_SentryX_Manual_APS_AUS_eng_A4.pdf.

Sentire Radar "SR-1200E | 24 GHZ FMVW Radar Module" accessed Sep. 5, 2019, https://radar-sensor.com/products/radar-modules/sr-1200e.html.

Verma, et al, "Frequency Estimation from Waveforms Using Multi-Layered Neural Networks," Interspeech 2016, Sep. 8-12, 2016, San Francisco, https://www.isca-speech.org/archive/interspeech_2016/verma16_interspeech.html.

Watkins, J., "Utilizing Near-Field Measurements to Characterize Far-Field Radar Signatures,," Jun. 2004, Department of the Air Force Air University, Wright-Patterson, Air Force Base, Ohio, 111 pages.

\* cited by examiner

LEGEND:
___ ..... Reference line of x=y
.    ..... Data points

LEGEND:
___ ..... Reference line of x=y
. ..... Data points

LEGEND:
___ ..... Reference line of x=y
. ..... Data points

LEGEND:
___ ..... Reference line of x=y
.    ..... Data points

NEAR RANGE RADAR

CROSS-REFERENCE TO RELATED APPLICATIONS

This application claims the benefit of U.S. Provisional Application Ser. No. 62/924,025 titled "NEAR RANGE RADAR," filed by Banner Engineering Corp. on Oct. 21, 2019.

This application incorporates the entire contents of the foregoing application(s) herein by reference.

TECHNICAL FIELD

Various embodiments relate generally to radars.

BACKGROUND

Radar is a detection system that uses radio waves to determine the range, angle, or velocity of objects. Radar may be used to detect aircraft, ships, spacecraft, guided missiles, motor vehicles, weather formations, and terrain. A radar system may include a transmitter producing electromagnetic waves in the radio or microwaves domain and a receiver. Radio waves (pulsed or continuous) from the transmitter reflect off the object and return to the receiver, giving information about the object's location and speed.

Recently, radar apparatuses are used as, for example, anti-collision devices for motor vehicles. FMCW (Frequency Modulated Continuous Wave) radar apparatuses have been known as such a radar apparatus. The FMCW radar apparatuses are designed to use a frequency-modulated radio continuous wave signal (FMCW wave signal) as a transmission signal.

SUMMARY

Apparatus and associated methods relate to enabling a radar system to use different sensing mechanisms to estimate a distance from a target based on different detection zones (e.g., far-field and near-field). In an illustrative example, a curve fitting method may be applied for near-field sensing, and a Fourier transform may be used for far-field sensing. A predetermined set of rules may be applied to select when to use the near-field sensing mechanism and when to use the far-field mechanism. The frequency of a target signal within a beat signal that has less than two sinusoidal cycles may be estimated with improved accuracy. Accordingly, the distance of a target that is within a predetermined distance range (e.g., two meters range for 24 GHz ISM band limitation) may be reliably estimated.

Various embodiments may achieve one or more advantages. For example, in an embodiment that uses 24 Ghz ISM limitations, a shorter distance threshold may be applied to ignore a vehicle at 1.5 m while detecting a vehicle at 0.5 m. Without implementing different sensing mechanisms, a vehicle at 1.5 m and one at 0.5 m would be indistinguishable to the radar system. In some embodiments, an analog output or serial distance output sensor may provide accurate distance measurement, allowing more precise anti-collision applications, and maintaining reliable measurement at dynamically changing temperatures and environments.

The details of various embodiments are set forth in the accompanying drawings and the description below. Other features and advantages will be apparent from the description and drawings, and from the claims.

BRIEF DESCRIPTION OF THE DRAWINGS

Like reference symbols in the various drawings indicate like elements.

DETAILED DESCRIPTION OF ILLUSTRATIVE EMBODIMENTS

Figure 1A:
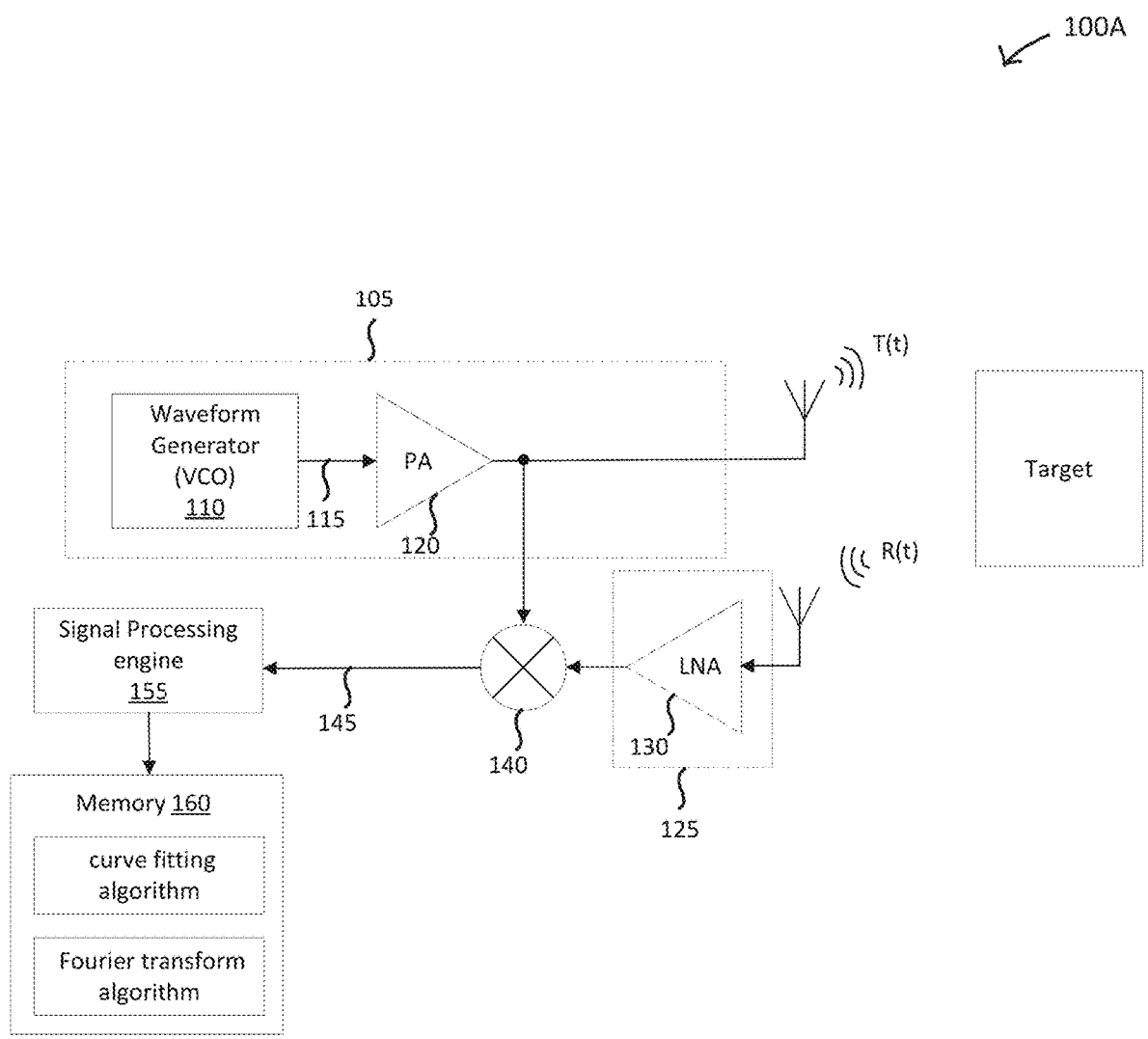
FIG. 1A depicts an exemplary radar system configured to detect both near-field targets and far-field targets.

FIG. 1A depicts an exemplary radar system configured to detect both near-field targets and far-field targets. In this depicted example, the radar system 100A includes a transmitting circuit 105 configured to provide a transmitting signal T(t) to be transmitted by a first antenna. The radar system 100A also includes a receiving circuit 125 operatively configured to receive a reflected portion R(t) of the transmission signal T(t) from a second antenna. A downconverter 140 is configured to mix the reflected portion R(t) with the transmitted signal T(t) to generate a beat signal 145.

The radar system 100A also includes a signal processing engine 155 configured to receive the beat signal 145 and calculate the frequency of a target signal (now shown) within the beat signal 145 to determine the distance D to the target. Besides the target signal, the beat signal 145 may also include low frequency noise signals. For example, the low frequency noise signals may include voltage-controlled oscillator (VCO) crosstalk noise. For example, the low frequency noise signals may include one or more radome reflection signals. The low frequency noise signals may be identified and then invalided during the frequency estimation process.

The radar system 100A also includes a data store 160 (e.g., memory) coupled to the signal processing engine 155 and containing a program of instructions that, when executed by the signal processing engine 155, cause the signal processing engine 155 to perform operations to perform a target distance measurement, the operations includes: (i) performing a time-domain estimation algorithm to estimate a first frequency of a target signal within the beat signal using a curve fitting method, (ii) performing a frequency-domain estimation algorithm to estimate a second frequency of the target signal using a Fourier transform method, (iii)

determining whether the first frequency is less than a first predetermined frequency and determining whether the second frequency is larger than a second predetermined frequency, (iv) if the first frequency is less than the first predetermined frequency, then, selecting the first frequency to compute the distance to the target, (v) if the second frequency is larger than the second predetermined frequency, then, selecting the second frequency to compute the distance to the target, and, (vi) if both the first frequency and the second frequency are ranged between the first predetermined frequency and the second predetermined frequency, then, using a combination of the first frequency and the second frequency to compute the distance to the target. Thus, by applying different sensing mechanisms based on different detection zones (e.g., far-field and near-field), a distance from the target may be accurately estimated.

In this depicted example, the transmitting circuit 105 includes a waveform generator (e.g., a voltage controlled oscillator VCO 110) configured to generate a high-frequency continuous-wave signal 115 with its frequency varying according to a modulation voltage signal (not shown) applied thereto. For example, a millimeter continuous-wave signal may be used as the high-frequency continuous-wave signal 115. The high-frequency continuous-wave signal 115 may be frequency modulated to have a frequency that linearly varies up and down cyclically over time. The transmitting circuit 105 also includes a power amplifier 120 configured to convert a low-power signal into a higher-power signal and drive the first antenna. The first antenna is operative to transmit the transmission signal 110 sent from the VCO 115 as a radio continuous-wave signal that uses a chirp waveform, such as, a sawtooth or triangle wave pattern, for example.

In some embodiments, the radar system may include a MIMO radar that includes a number of M antennas (M is an integer equal to or greater than 2) configured to transmit the radar signal T(t) and a number of N antennas (N is an integer equal to or greater than 2) configured to receive the reflected portion R(t). In this depicted example, the receiving circuit 125 also includes a low-noise amplifier (LNA) 130 configured to amplify the received signal R(t) without significantly degrading the signal-to-noise ratio. In some embodiments, the receiving circuit 125 may also include a low-pass filter.

Because the transmitted and received signals are mutually delayed, the instantaneous frequencies of the transmitted and received pulsed signal are different, the beat signal 145 obtained at the output of downconverter 140 has a differential frequency F, which is directly proportional to the unknown distance D to the target. In some embodiments, the downconverter 140 may also generate at least one low frequency noise component in addition to information about the target signal. The at least one low frequency component may be coupled via a leakage path from the transmitting circuit 105. For example, the low frequency component may include a leakage signal generated by the VCO 110 in the transmitting circuit 105. The at least one low frequency component may also include a reflected signal from a radome disposed in a path of the transmitted signal T(t).

In some embodiments, if the target signal contains cycles no less than the predetermined number of sinusoidal cycles, then, the signal processing engine 155 may be configured to perform a fast Fourier transform on the target signal. The operations may also include (b2) estimating a frequency of the target signal and (c2) determining a distance to the target based on the estimated frequency of the target signal.

In some embodiments, the target signal may have a number of sinusoidal cycles that is less than a predetermined number of cycles. The predetermined number of cycles may be, for example, 2. In some embodiments, the curve-fitting function may be generated by machine learning. Different neural network models may be trained to generate the curve-fitted function. In some embodiments, the frequency estimation may also be generated by machine learning. In some embodiments, the operations may also include rejecting the at least one low frequency component generated by the downconverter 140.

Figure 1B:
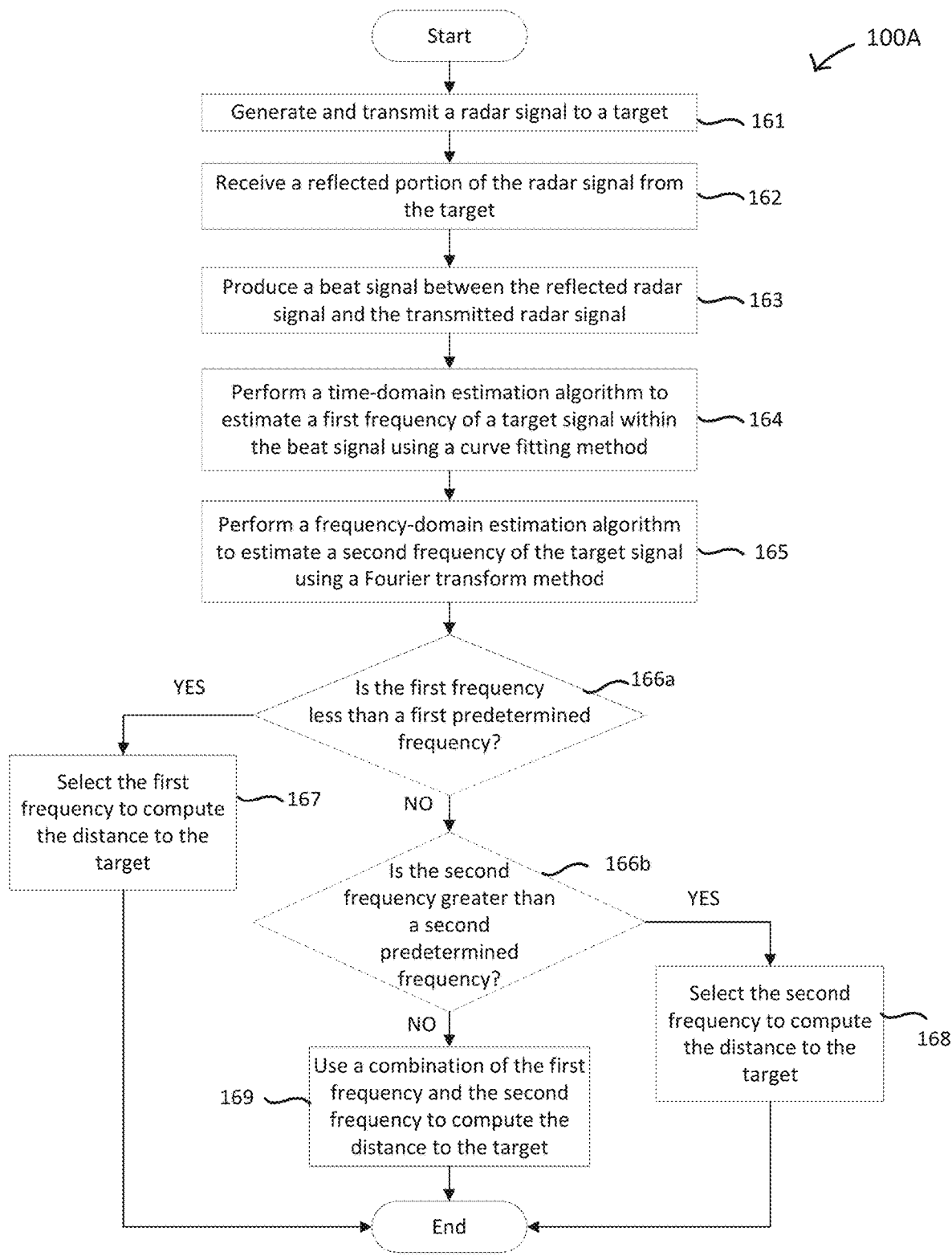
FIG. 1B depicts a flow chart of an exemplary method to operate the radar system.

FIG. 1B depicts a flowchart of an exemplary method to operate the radar system. An exemplary method 100B used to operate the radar system is discussed. The method 100B includes, at 161, generating and transmitting (e.g., by the transmitting circuit 105) a radar signal (e.g., T(t)) to a target. The method 100B includes, at 162, receiving a reflected portion (e.g., R(t)) of the radar signal from the target, and, at 163, producing a beat signal (e.g., the beat signal 145) between the reflected radar signal (R(t)) and the transmitted radar signal (T(t)).

The method 100B includes, at 164, performing a time-domain estimation algorithm to estimate a first frequency of a target signal within the beat signal 145 using a curve fitting method, and, at 165, performing a frequency-domain estimation algorithm to estimate a second frequency of the target signal using a Fourier transform method.

The method 100B includes, at 166a, determining whether the first frequency is less than a first predetermined frequency. If the first frequency is less than the first predetermined frequency, then, at 167, the method 100B includes selecting the first frequency to compute the distance to the target. If the first frequency is no less than the first predetermined frequency, then, at 166b, the method 100B includes determining whether the second frequency is larger than a second predetermined frequency.

If the second frequency is larger than the second predetermined frequency, then, at 168, the method includes selecting the second frequency to compute the distance to the target. If both the first frequency and the second frequency are ranged between the first predetermined frequency and the second predetermined frequency, then, then, at 169, the method 100B includes using a combination of the first frequency and the second frequency to compute the distance to the target. Thus, by applying different sensing mechanisms based on different detection zones (e.g., far-field and near-field), a distance from the target may be accurately estimated. Thus, by applying different sensing mechanisms based on different detection zones (e.g., far-field and near-field), a distance from the target may be accurately estimated.

Figure 1C:
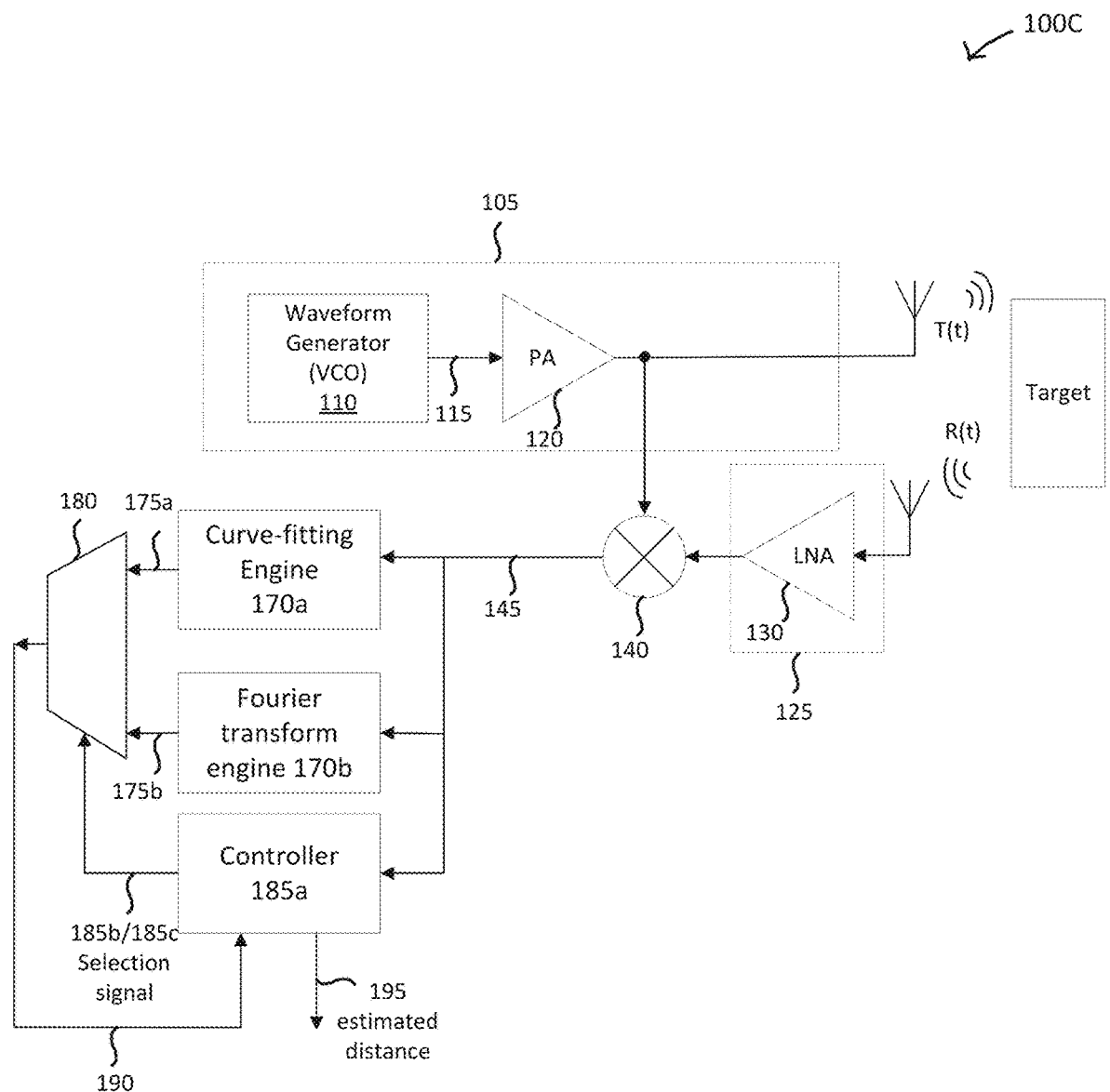
FIG. 1C depicts another exemplary radar system configured to detect both near-field targets and far-field targets.

FIG. 1C depicts another exemplary radar system configured to detect both near-field targets and far-field targets. In this depicted example, the beat signal 145 is received by a curve-fitting engine 170a. The curve-fitting engine 170a uses a curve-fitting function to the target signal within the beat signal 145. The curve-fitting function may include a sine wave fit. A frequency of the target signal may be estimated by the curve-fitting engine 170a. A first estimated frequency signal 175a is then received by a multiplexer 180. The beat signal 145 is also received by a Fourier transform engine 170b. The Fourier transform engine 170b is configured to perform a Fourier transform on the target signal to estimate a frequency of the target signal. A second estimated frequency signal 175b is then received by the multiplexer 180.

The beat signal 145 is also received by a controller 185a. The controller 185a determines whether the first frequency is less than a first predetermined frequency. If the first frequency is less than the first predetermined frequency, then, the controller 185a selects the first frequency to compute the distance to the target. If the first frequency is no less than the first predetermined frequency, then, at 166b, the controller 185a determines whether the second frequency is larger than a second predetermined frequency. If the second frequency is larger than the second predetermined frequency, then, the controller 185a selects the second frequency to compute the distance to the target. If both the first frequency and the second frequency are ranged between the first predetermined frequency and the second predetermined frequency, then, the controller 185a selects to use a combination of the first frequency and the second frequency to compute the distance to the target. Thus, by applying different sensing mechanisms based on different detection zones (e.g., far-field and near-field), a distance from the target may be accurately estimated. Thus, by applying different sensing mechanisms based on different detection zones (e.g., far-field and near-field), a distance from the target may be accurately estimated.

In some embodiments, the controller 185a may be configured to determine whether the target signal contains cycles less than the predetermined number of sinusoidal cycles. If the target signal contains cycles less than the predetermined number of sinusoidal cycles, the controller 185a may generate a first selection signal 185b to enable the multiplexer 180 output the first frequency signal 175a. If the target signal contains cycles no less than the predetermined number of sinusoidal cycles, the controller 185a may generate a second selection signal 185c to enable the multiplexer 180 output the second frequency signal 175b. The selected frequency signal (e.g., 175a, 175b) may be then received by the controller 185a. The controller 185a then may calculate a distance to the target based on the estimated frequency (e.g., 175a, 175b) of the target signal. Thus, by applying different sensing mechanisms based on different detection zones (e.g., far-field and near-field), a distance from the target may be accurately estimated.

In some embodiments, part or all features of the radar system 100A may be implemented in a same or different field programmable gate arrays (FPGAs). Part or all features of the radar system 100C may also be implemented in a same or different field programmable gate arrays (FPGAs). In some embodiments, part or all features of the radar system 100A and/or 100C may be implemented in ASIC.

Figure 2:
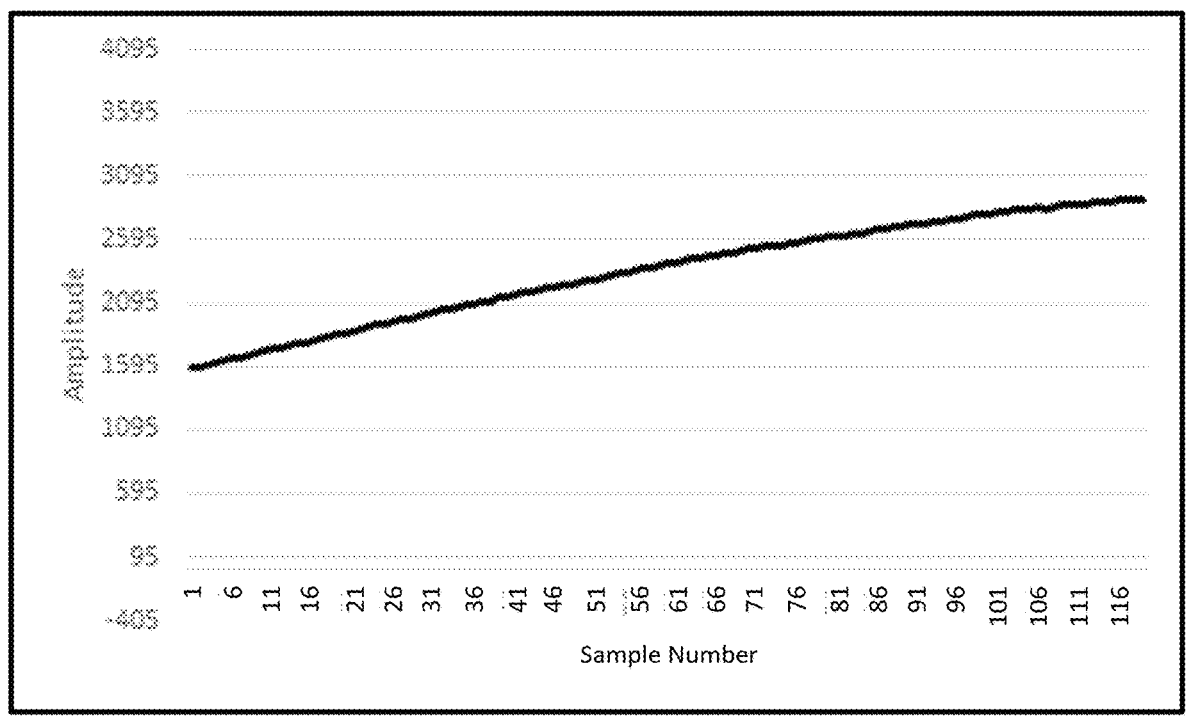
FIG. 2 shows an exemplary beat signal when no target is present.
Figure 3:
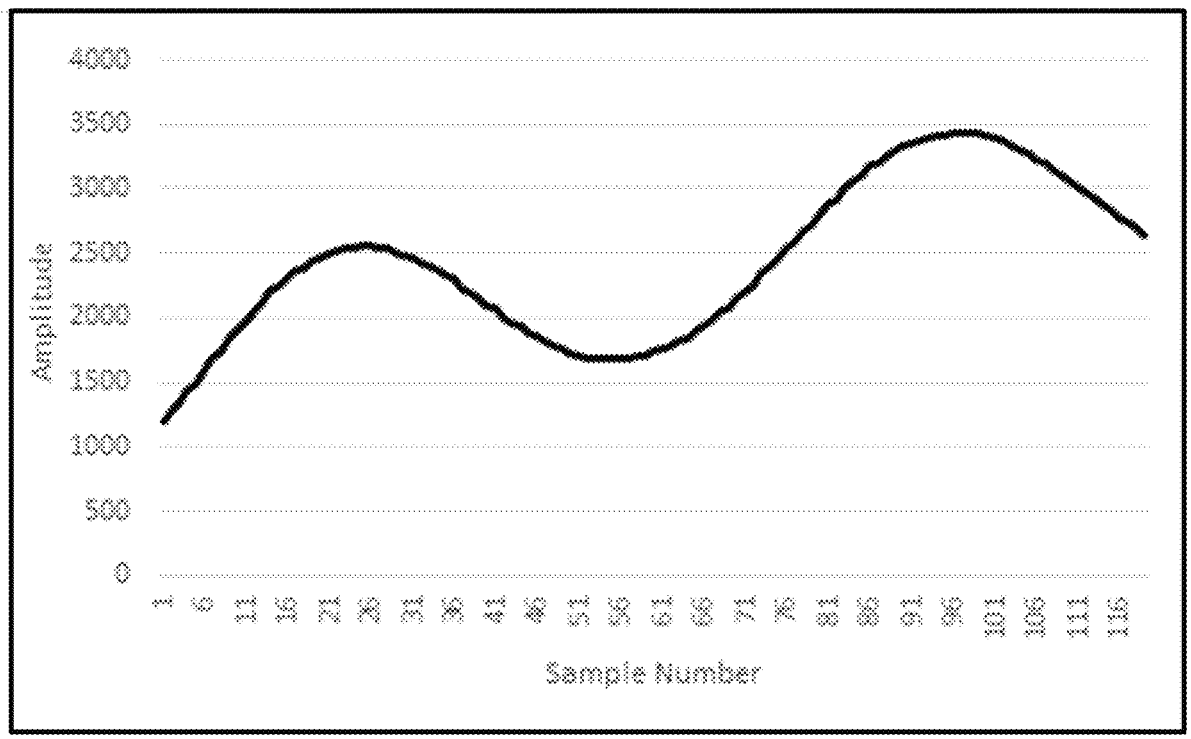
FIG. 3 depicts an exemplary radar received beat signal when target is present and target return is corrupted by the low frequency noise.

FIG. 2 shows an exemplary beat signal when no target is present. The beat signal is composed of VCO leakage and/or one or more radome reflections FIG. 3 depicts an exemplary beat signal when target is present. An exemplary radar received beat signal is corrupted by the low frequency noise or linear distortion. In this example, the beat signal contains about 1.5 cycles of sinusoid.

Figure 4:
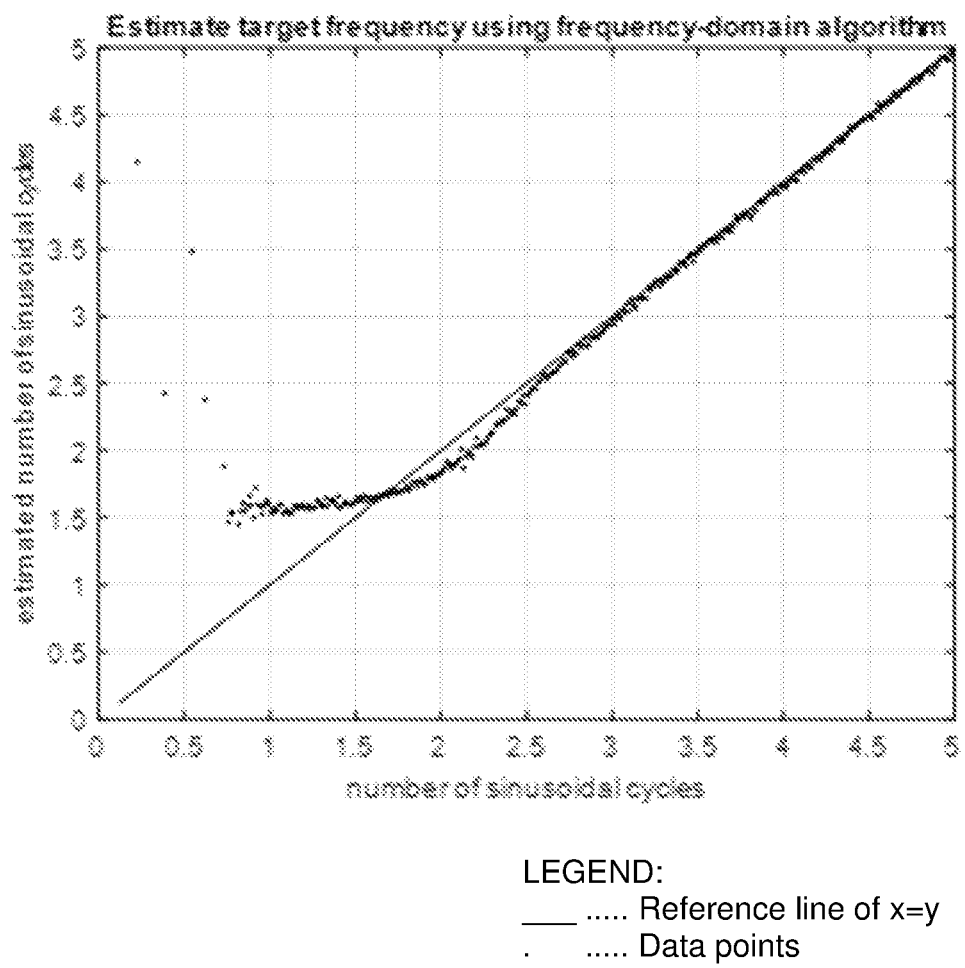
FIG. 4 depicts an exemplary result of frequency measurement using frequency-domain algorithm.

FIG. 4 depicts an exemplary result of frequency measurement using frequency-domain algorithm. Fourier Transform (e.g., fast Fourier Transform FFT) is used to estimate the target frequency. When the beat signal contains less than 2-3 cycles of sinusoid, the frequency could not be accurately measured by using Fourier Transform, which limits the capability of a radar sensor on measuring the target distance in the near range. Another algorithm may be used to improve the performance of the radar sensor on near range target distance measurement.

Alternatively, frequency may be estimated using time-domain algorithm by conducting a curve fit to the beat signal. Time-domain algorithm shows good linearity for near range target, even when corrupted with low frequency noise.

Figure 5:
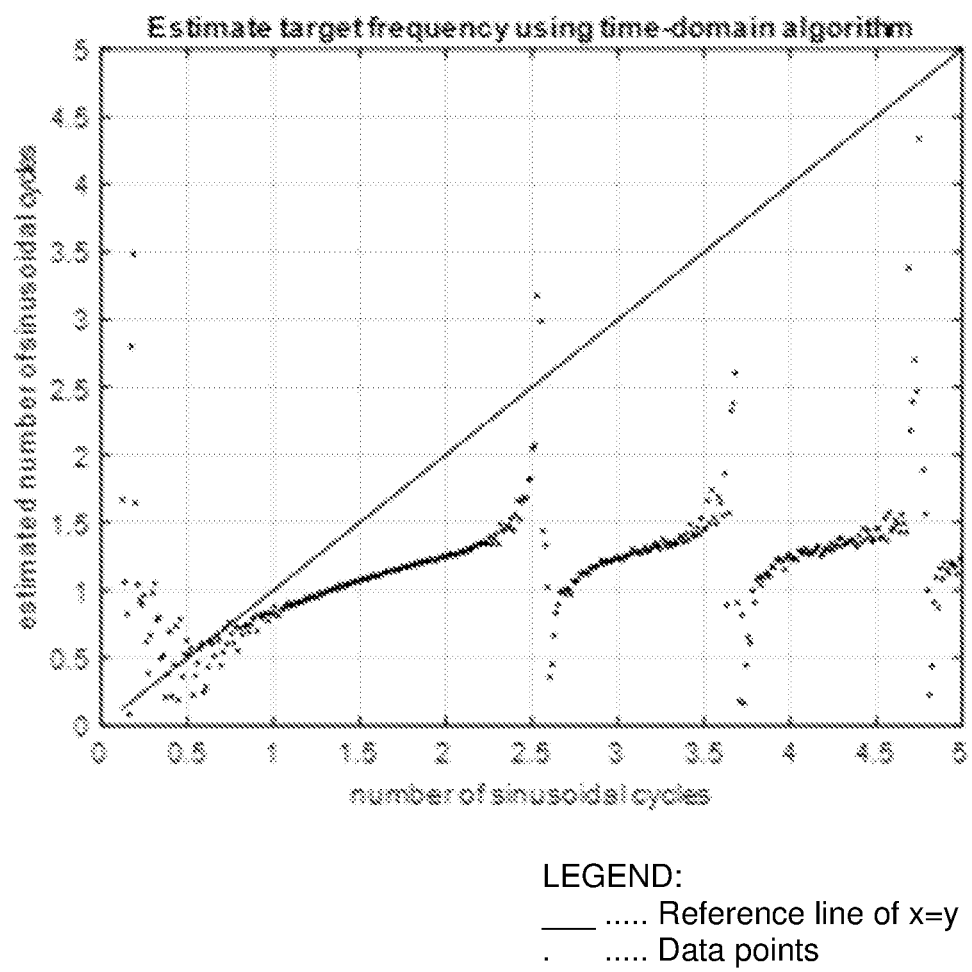
FIG. 5 depicts an exemplary result of frequency measurement using time-domain algorithm.

FIG. 5 depicts an exemplary result of frequency measurement using time-domain algorithm. The time-domain algorithm shows good linearity when the received beat signal contains less than 2 cycles of sinusoid, then starts degrading, at that point, the sensing mechanism may be switched to use Fourier Transform. To decide whether the frequency estimate from the time-domain algorithm is in the linear range or not, one may compare the estimated amplitude against a pre-determined threshold. If the amplitude is less than the pre-determined threshold, the frequency estimate can be treated as out of the linear operation range and marked invalid, given the observation that for far-range target returns, the curve-fitted function usually results in a very small amplitude.

Figure 6:
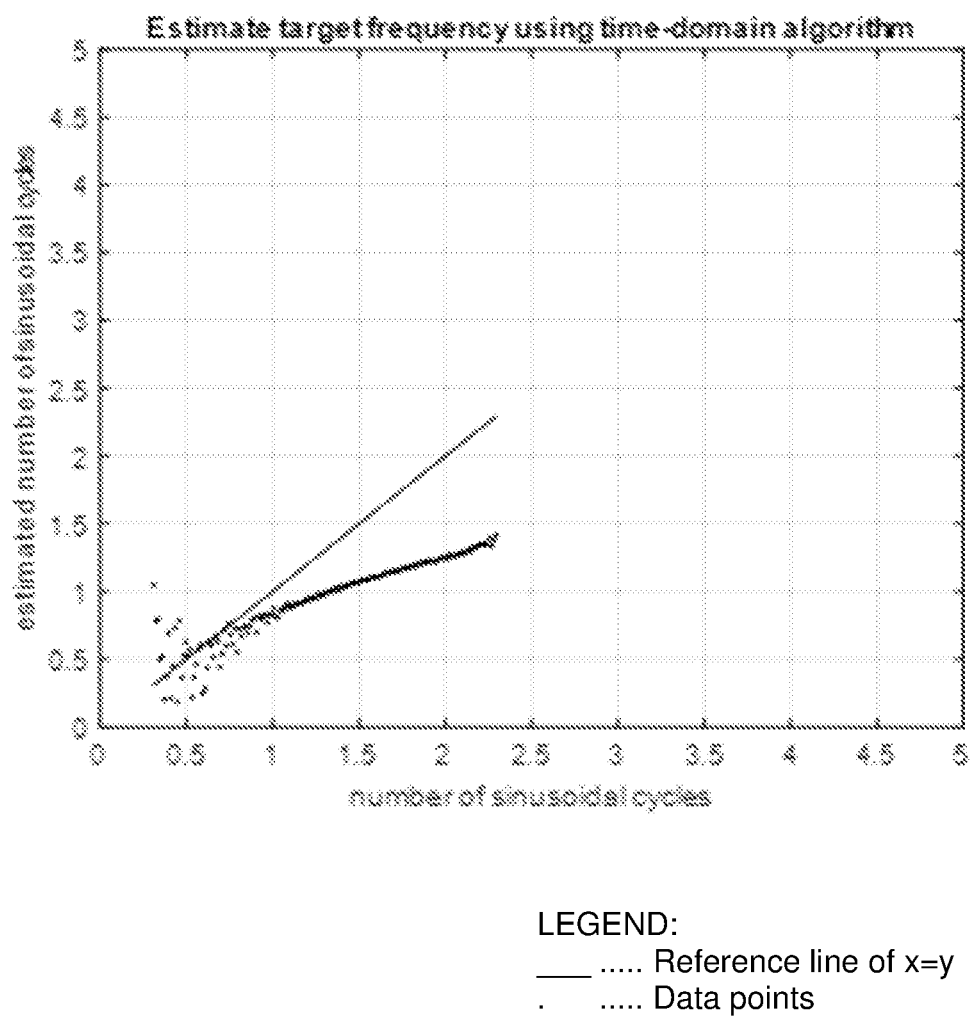
FIG. 6 depicts an exemplary result of valid frequency measurement using time-domain algorithm.

FIG. 6 depicts an exemplary result of valid frequency measurement using time-domain algorithm. Further improvement may be made to improve the absolute frequency/distance accuracy in the time-domain algorithm.

Figure 7:
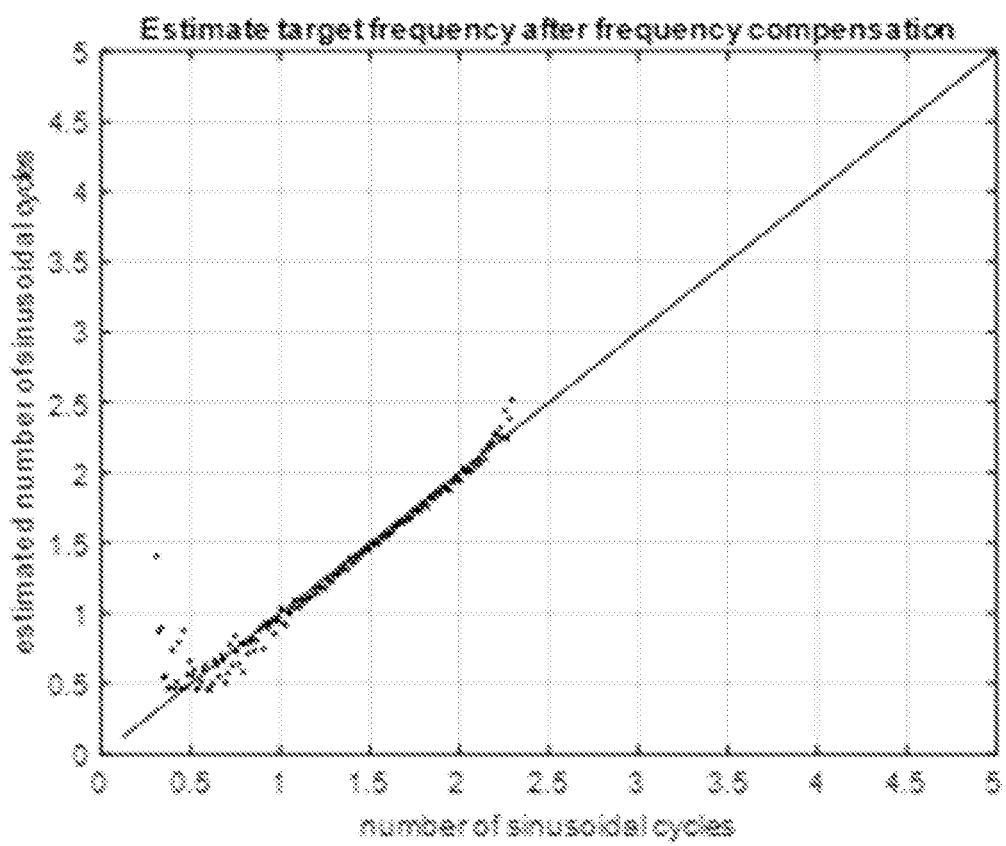
FIG. 7 depicts an exemplary result of valid frequency measurement using time-domain algorithm after frequency offset compensation.

FIG. 7 depicts an exemplary result of valid frequency measurement using time-domain algorithm after frequency offset compensation.

Figure 8:
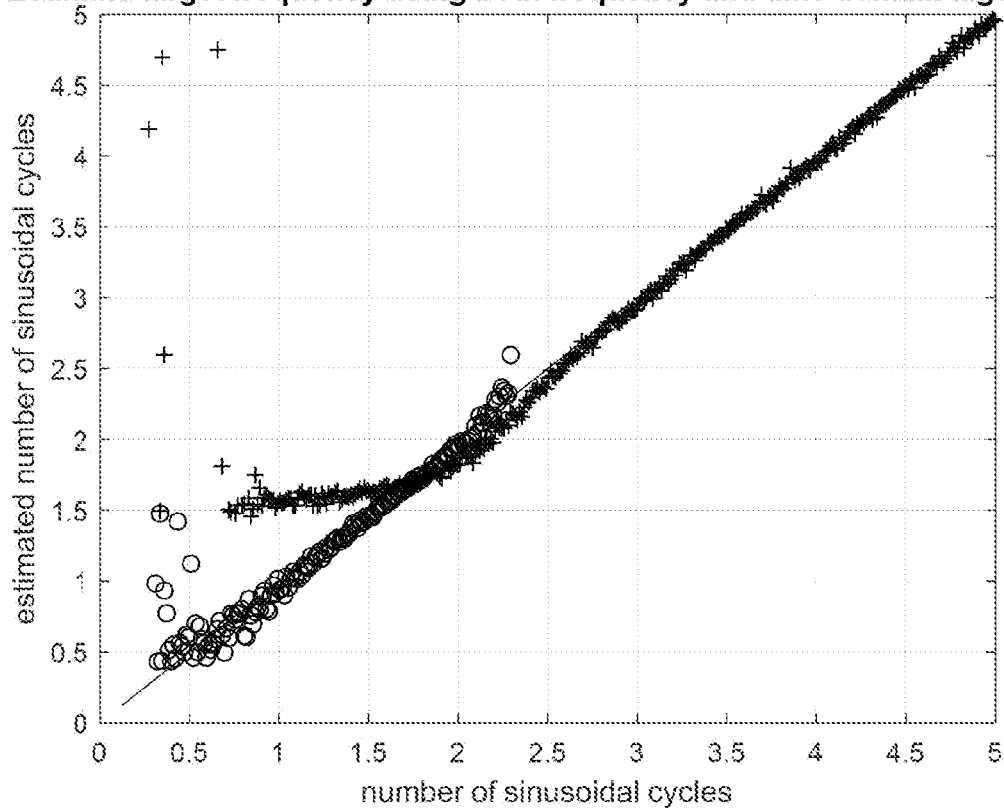
FIG. 8 depicts an exemplary result of frequency measurement using both time-domain and frequency-domain algorithm.

FIG. 8 depicts an exemplary result of frequency measurement using both time-domain and frequency-domain algorithm. A set of rules described in FIG. 1B may be used to decide the switching mechanism between the two sensing modes.

Figure 9:
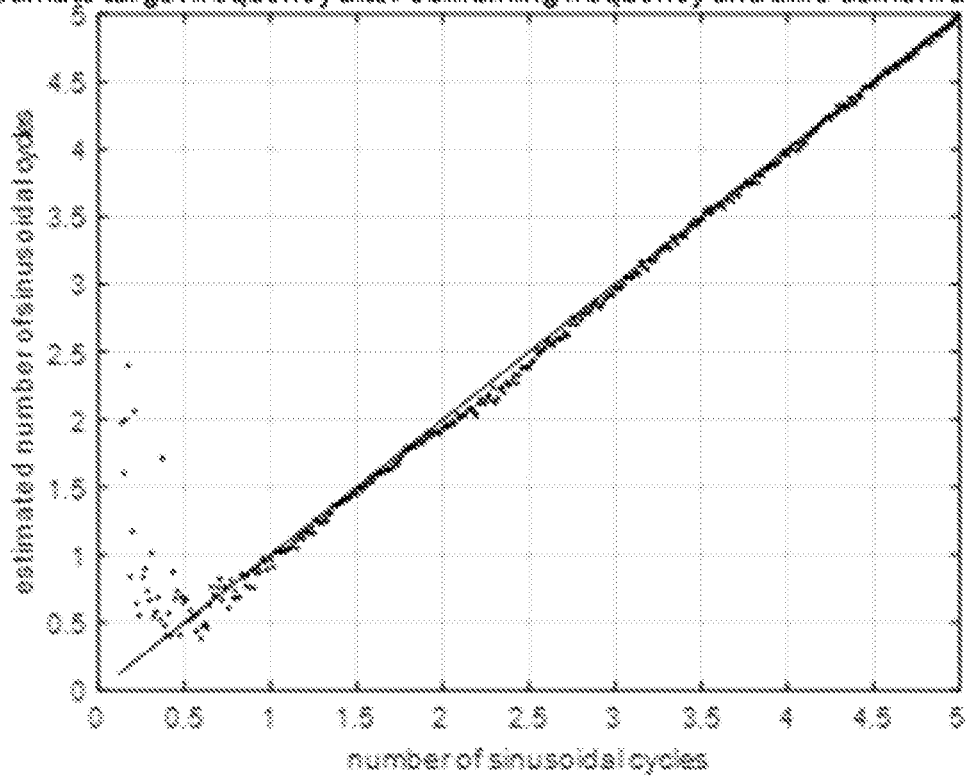
FIG. 9 depicts an exemplary final result of frequency measurement after combining time-domain and frequency-domain algorithm.

FIG. 9 depicts an exemplary final result of frequency measurement after combining time-domain and frequency-domain algorithm. Final frequency estimate shows good linearity in both near and far range target returns.

Although various embodiments have been described with reference to the figures, other embodiments are possible. For example, some circuit implementations may be controlled in response to signals from analog or digital components, which may be discrete, integrated, or a combination of each. Some embodiments may include programmed and/or programmable devices (e.g., microcontroller, microprocessor), and may include one or more data stores (e.g., cell, register, block, page) that provide single or multi-level digital data storage capability, and which may be volatile and/or non-volatile. Some control functions may be implemented in hardware, software, firmware, or a combination of any of them.

In one exemplary aspect, a radar system, includes (a) a transmitting circuit configured to transmit a radar signal to a target, (b) a receiving circuit configured to receive a reflected portion of the transmitted radar signal from the target, (c) a mixer circuit configured to produce a beat signal between the reflected radar signal and the transmitted radar signal, (d) a signal processing engine, and (e) a data store coupled to the signal processing engine. The data store contains a program of instructions that, when executed by the signal processing engine, cause the signal processing engine to perform operations to compute a distance measurement to the target, the operations include: (i) performing a time-domain estimation algorithm to estimate a first frequency of a target signal within the beat signal using a curve fitting method, (ii) performing a frequency-domain estimation algorithm to estimate a second frequency of the target signal using a Fourier transform method, (iii) determining whether the first frequency is less than a first predetermined frequency and determining whether the second frequency is larger than a second predetermined frequency, (iv) if the first frequency is less than the first predetermined frequency, then, selecting the first frequency to compute the distance to the target, (v) if the second frequency is larger than the second predetermined frequency, then, selecting the second frequency to compute the distance to the target, and (vi) if both the first frequency and the second frequency are ranged between the first predetermined frequency and the second predetermined frequency, then, using a combination of the first frequency and the second frequency to compute the distance to the target.

In some embodiments, the first and second predetermined frequencies may be between one and three cycles within a radar's sweep period. In some embodiments, the operations may also include comparing a computed distance obtained from the selected frequency with a set of thresholds to determine the validity of the computed distance. In some embodiments, the operations may also include comparing a measured phase obtained from the selected frequency with a set of thresholds to further determine validity of the computed distance.

In some embodiments, the operations may also include comparing a measured amplitude obtained from the selected frequency with a set of thresholds to further determine validity of the computed distance. In some embodiments, the beat signal may include low frequency noise signals. In some embodiments, the low frequency noise signals may include voltage-controlled oscillator (VCO) crosstalk noise. In some embodiments, the low frequency noise signals may include one or more radome reflection signals. In some embodiments, the operations may also include utilizing a plurality of target estimations from the time-domain frequency estimation and frequency-domain frequency estimation before determining a final target frequency estimation.

In another exemplary aspect, a radar system includes (a) a transmitting circuit configured to transmit a radar signal to a target, (b) a receiving circuit configured to receive a reflected portion of the transmitted radar signal from the target, (c) a mixer circuit configured to produce a beat signal between the reflected radar signal and the transmitted radar signal, (d) a signal processing engine, and, (e) a data store coupled to the signal processing engine. The data store contains a program of instructions that, when executed by the signal processing engine, cause the signal processing engine to perform operations to perform a target distance measurement, the operations includes (i) performing a time-domain estimation algorithm to estimate a first frequency of a target signal within the beat signal using a curve fitting method and (ii) computing a distance to the target based on the estimated frequency of the target signal.

In some embodiments, the estimated first frequency may be less than three cycles within a radar's sweep period. In some embodiments, the estimated first frequency may be less than one cycle within a radar's sweep period. In some embodiments, the estimated first frequency may be generated by machine learning. In some embodiments, the curve-fitting function may include a sine fit transform. In some embodiments, the operations may also include (iii) comparing a computed distance obtained from the selected frequency with a set of thresholds to determine the validity of the computed distance.

In some embodiments, the operations may also include (iv) comparing a measured phase obtained from the selected frequency with a set of thresholds to further determine validity of the computed distance. In some embodiments, the operations may also include (v) comparing a measured amplitude obtained from the selected frequency with a set of thresholds to further determine validity of the computed distance.

In some embodiments, the beat signal further may include low frequency noise signals. In some embodiments, a plurality of phases may be used to separate the target signal from low frequency noise signals within the beat signal. In some embodiments, the low frequency noise signals may include voltage-controlled oscillator (VCO) crosstalk noise. In some embodiments, the low frequency noise signals may include one or more radome reflection signals. In some embodiments, the operations may also include (vi) utilizing a plurality of target estimations before determining a final target frequency estimation. In some embodiments, a plurality of phases of the target signal are used to estimate the frequency and validity of the target signal.

In another exemplary aspect, a radar system includes (a) a transmitting circuit configured to transmit a radar signal to a target, (b) a receiving circuit configured to receive a reflected portion of the transmitted radar signal from the target and detect a beat signal between the reflected radar signal and the transmit radar signal, (c) a mixer circuit configured to produce a beat signal between the reflected radar signal and the transmitted radar signal, (d) a curve fit engine configured to receive the beat signal and perform a curve fitting method on the beat signal to measure a frequency of a target signal within the beat signal, (e) a Fourier transform engine configured to receive the beat signal and perform a Fourier transform on the beat signal to measure the frequency of the target signal, (f) a controller, operably coupled to the curve fit engine and the Fourier transform engine, configured to selectively use a first frequency estimated by the curve fit engine and a second frequency estimated the Fourier transform engine in response to a predetermined set of rules.

In another exemplary aspect, a method includes (a) generating and transmitting a radar signal to a target, (b) receiving a reflected portion of the radar signal from the target and detecting a beat signal between the reflected radar signal and the transmit radar signal, (c) performing a curve fitting method on the beat signal to measure a first frequency of a target signal within the beat signal, (d) performing a Fourier transform on the beat signal to measure a second frequency of the target signal, (e) if the first frequency is less than the first predetermined frequency, then, selecting the first frequency to compute the distance to the target, (f) if the second frequency is larger than the second predetermined frequency, then, selecting the second frequency to compute the distance to the target, and, (g) if both the first frequency and the second frequency are ranged between the first predetermined frequency and the second predetermined frequency, then, using a combination of the first frequency and the second frequency to compute the distance to the target.

In some existing FMCW radar applications, an inherent leakage signal (e.g., a by-product of the transmitted signal from the voltage controlled oscillator (VCO)) may exist in the path of the receiver due to, for example, insufficient isolation between the transmit and receive antennas. This leakage signal may be mixed in the same manner as the reflections from the targets. Due to a small propagation delay, a beat frequency may be established which resides very close to the direct current (DC) level and may result in low frequency interference on the received signal.

The low frequency components may be suppressed using a high pass filter either in the time domain or frequency domain, by way of hardware and/or software implementation. In order to reliably suppressing the low frequency components, a large region may be maintained in front of the radar receiver, within which a reliable distance may not be measured. This large region is commonly referred to as the dead zone. For example, for an existing 24 GHz FMCW radar sweeping at 200 MHz bandwidth, the suppression could result in a two to three meter dead zone. For applications that want an early warning detection or tracking objects as close as possible to the radar transmitter, the existing methods may not work effectively or reliably.

The low frequency components may be suppressed by suppressing the VCO leakage. The VCO leakage may be suppressed as part of the radar calibration routine. After suppression, the radar may be capable of measuring a near range target, however, the calibration data is temperature and environment dependent, requiring recalibration for changes in either temperature (or environment) which adds a level of complexity that is dissatisfying to users and impractical. Some existing FMCW radar sensors can neither measure distance both in the far field and in the near field, nor allow for dynamic drift to accommodate environmental factors.

Some aspects of embodiments may be implemented as a computer system. For example, various implementations may include digital and/or analog circuitry, computer hardware, firmware, software, or combinations thereof. Apparatus elements can be implemented in a computer program product tangibly embodied in an information carrier, e.g., in a machine-readable storage device, for execution by a programmable processor; and methods can be performed by a programmable processor executing a program of instructions to perform functions of various embodiments by operating on input data and generating an output. Some embodiments can be implemented advantageously in one or more computer programs that are executable on a programmable system including at least one programmable processor coupled to receive data and instructions from, and to transmit data and instructions to, a data storage system, at least one input device, and/or at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other units suitable for use in a computing environment.

Suitable processors for the execution of a program of instructions include, by way of example and not limitation, both general and special purpose microprocessors, which may include a single processor or one of multiple processors of any kind of computer. Generally, a processor will receive instructions and data from a read-only memory or a random access memory or both. The essential elements of a computer are a processor for executing instructions and one or more memories for storing instructions and data. Storage devices suitable for tangibly embodying computer program instructions and data include all forms of non-volatile memory, including, by way of example, semiconductor memory devices, such as EPROM, EEPROM, and flash memory devices; magnetic disks, such as internal hard disks and removable disks; magneto-optical disks; and, CD-ROM and DVD-ROM disks. The processor and the memory can be supplemented by, or incorporated in, ASICs (application-specific integrated circuits). In some embodiments, the processor and the member can be supplemented by, or incorporated in hardware programmable devices, such as FPGAs, for example.

In some implementations, each system may be programmed with the same or similar information and/or initialized with substantially identical information stored in volatile and/or non-volatile memory. For example, one data interface may be configured to perform auto configuration, auto download, and/or auto update functions when coupled to an appropriate host device, such as a desktop computer or a server.

In some implementations, one or more user-interface features may be custom configured to perform specific functions. An exemplary embodiment may be implemented in a computer system that includes a graphical user interface and/or an Internet browser. To provide for interaction with a user, some implementations may be implemented on a computer having a display device, such as an LCD (liquid crystal display) monitor for displaying information to the user, a keyboard, and a pointing device, such as a mouse or a trackball by which the user can provide input to the computer.

In various implementations, the system may communicate using suitable communication methods, equipment, and techniques. For example, the system may communicate with compatible devices (e.g., devices capable of transferring data to and/or from the system) using point-to-point communication in which a message is transported directly from the source to the data storage device over a dedicated physical link (e.g., fiber optic link, point-to-point wiring, daisy-chain). The components of the system may exchange information by any form or medium of analog or digital data communication, including packet-based messages on a communication network. Examples of communication networks include, e.g., a LAN (local area network), a WAN (wide area network), MAN (metropolitan area network), wireless and/or optical networks, and the computers and networks forming the Internet. Other implementations may transport messages by broadcasting to all or substantially all devices that are coupled together by a communication network, for example, by using Omni-directional radio frequency (RF) signals. Still other implementations may transport messages characterized by high directivity, such as RF signals transmitted using directional (i.e., narrow beam) antennas or infrared signals that may optionally be used with focusing optics. Still other implementations are possible using appropriate interfaces and protocols such as, by way of example and not intended to be limiting, USB 2.0, Fire wire, ATA/IDE, RS-232, RS-422, RS-485, 802.11 a/b/g, Wi-Fi, Ethernet, IrDA, FDDI (fiber distributed data interface), token-ring networks, or multiplexing techniques based on frequency, time, or code division. Some implementations may optionally incorporate features such as error checking and correction (ECC) for data integrity, or security measures, such as encryption (e.g., WEP) and password protection.

Computer program products may contain a set of instructions that, when executed by a processor device, cause the processor to perform prescribed functions. These functions may be performed in conjunction with controlled devices in operable communication with the processor. Computer program products, which may include software, may be stored in a data store tangibly embedded on a storage medium, such as an electronic, magnetic, or rotating storage device, and may be fixed or removable (e.g., hard disk, floppy disk, thumb drive, CD, DVD).

A number of implementations have been described. Nevertheless, it will be understood that various modification may be made. For example, advantageous results may be achieved if the steps of the disclosed techniques were performed in a different sequence, or if components of the disclosed systems were combined in a different manner, or if the components were supplemented with other components. Accordingly, other implementations are contemplated.

What is claimed is:

1. A radar system comprising:
   (a) a transmitting circuit configured to transmit a radar signal to a target;
   (b) a receiving circuit configured to receive a reflected portion of the transmitted radar signal from the target;
   (c) a mixer circuit configured to produce a beat signal between the reflected radar signal and the transmitted radar signal;
   (d) a signal processing engine; and
   (e) a data store coupled to the signal processing engine, wherein the data store comprises a program of instructions that, when executed by the signal processing engine, cause the signal processing engine to perform operations to compute a distance measurement to the target, the operations comprising:
      (i) performing a time-domain estimation algorithm to estimate a first frequency of a target signal within the beat signal using a curve fitting method,
      (ii) performing a frequency-domain estimation algorithm to estimate a second frequency of the target signal using a Fourier transform method,
      (iii) determining whether the first frequency is less than a first predetermined frequency and determining whether the second frequency is larger than a second predetermined frequency,
      (iv) if the first frequency is less than the first predetermined frequency, then, selecting the first frequency to compute the distance measurement to the target,
      (v) if the second frequency is larger than the second predetermined frequency, then, selecting the second frequency to compute the distance measurement to the target, and
      (vi) if both the first frequency and the second frequency are ranged between the first predetermined frequency and the second predetermined frequency, then, using a combination of the first frequency and the second frequency to compute the distance measurement to the target.

2. The radar system of claim 1, wherein the first predetermined frequency and the second predetermined frequency are each between one and three cycles within a radar's sweep period.

3. The radar system of claim 1, the operations further comprising:
   comparing the computed distance measurement with a set of thresholds to determine validity of the computed distance.

4. The radar system of claim 1, the operations further comprising:
   comparing a measured phase with a set of thresholds to further determine validity of the computed distance, the phase being obtained from the frequency used to compute the distance measurement.

5. The radar system of claim 1, the operations further comprising:
   comparing a measured amplitude with a set of thresholds to further determine validity of the computed distance, the amplitude being obtained from the frequency used to compute the distance measurement.

6. The radar system of claim 1, wherein the beat signal comprises low frequency noise signals.

7. The radar system of claim 6, wherein the low frequency noise signals comprise voltage-controlled oscillator (VCO) crosstalk noise.

8. The radar system of claim 6, wherein the low frequency noise signals comprise one or more radome reflection signals.

9. The radar system of claim 1, the operations further comprising:
   utilizing a plurality of target estimations from the time-domain frequency estimation and the frequency-domain frequency estimation before determining a final target frequency estimation.

10. A radar system comprising:
    (a) a transmitting circuit configured to transmit a radar signal to a target;
    (b) a receiving circuit configured to receive a reflected portion of the transmitted radar signal from the target;
    (c) a mixer circuit configured to produce a beat signal between the reflected radar signal and the transmitted radar signal, wherein the beat signal comprises a plurality of frequencies;
    (d) a signal processing engine; and,
    (e) a data store coupled to the signal processing engine, wherein the data store contains a program of instructions that, when executed by the signal processing engine, cause the signal processing engine to perform operations to perform a target distance measurement, the operations comprising:
       (i) performing a time-domain estimation algorithm on the beat signal in the time domain to generate an estimate of a single frequency of a target signal within the beat signal using a curve fitting method, the single frequency having less than a predetermined number of sinusoidal cycles, and
       (ii) computing the distance to the target based on the estimated single frequency of the target signal.

11. The radar system of claim 10, wherein the estimated frequency is less than three cycles within a radar's sweep period.

12. The radar system of claim 10, wherein the estimated frequency is less than one cycle within a radar's sweep period.

13. The radar system of claim 10, wherein the estimated frequency is generated by machine learning.

14. The radar system of claim 10, wherein the curve-fitting method comprises a sine fit transform.

15. The radar system of claim 10, the operations further comprising:
    (iii) comparing the computed distance obtained from the estimated frequency with a set of thresholds to determine validity of the computed distance.

16. The radar system of claim 10, the operations further comprising:
    (iii) comparing a measured phase obtained from the estimated frequency with a set of thresholds to determine validity of the computed distance.

17. The radar system of claim 10, the operations further comprising:
    (iii) comparing a measured amplitude obtained from the estimated frequency with a set of thresholds to determine validity of the computed distance.

18. The radar system of claim 10, wherein the beat signal comprises low frequency noise signals.

19. The radar system of claim 18, wherein a plurality of phases is used to separate the target signal from the low frequency noise signals within the beat signal.

20. The radar system of claim 18, wherein the low frequency noise signals comprise voltage-controlled oscillator (VCO) crosstalk noise.

21. The radar system of claim 18, wherein the low frequency noise signals comprise at least one radome reflection signals.

22. The radar system of claim 10, the operations further comprising:
(iii) utilizing a plurality of target estimations before determining a final target frequency estimation.

23. The radar system of claim 10, wherein a plurality of phases of the target signal are used to estimate the frequency and validity of the target signal.

24. A radar system comprising:
(a) a transmitting circuit configured to transmit a radar signal to a target;
(b) a receiving circuit configured to receive a reflected portion of the transmitted radar signal from the target and detect a beat signal between the reflected radar signal and the transmitted radar signal;
(c) a mixer circuit configured to produce a beat signal between the reflected radar signal and the transmitted radar signal;
(d) a curve fit engine configured to receive the beat signal and perform a curve fitting method on the beat signal to measure a frequency of a target signal within the beat signal;
(e) a Fourier transform engine configured to receive the beat signal and perform a Fourier transform on the beat signal to measure the frequency of the target signal;
(f) a controller, operably coupled to the curve fit engine and the Fourier transform engine, configured to selectively use a first frequency estimated by the curve fit engine and a second frequency estimated the Fourier transform engine in response to a predetermined set of rules as a function of a predetermined near range frequency threshold and a predetermined far range frequency threshold.

25. A method comprising:
(a) generating and transmitting a radar signal to a target;
(b) receiving a reflected portion of the radar signal from the target and detecting a beat signal between the reflected radar signal and the transmitted radar signal;
(c) performing a curve fitting method on the beat signal to measure a first frequency of a target signal within the beat signal;
(d) performing a Fourier transform on the beat signal to measure a second frequency of the target signal;
(e) if the first frequency is less than a first predetermined frequency, then, selecting the first frequency to compute a distance to the target;
(f) if the second frequency is larger than a second predetermined frequency, then, selecting the second frequency to compute the distance to the target; and,
(g) if both the first frequency and the second frequency are ranged between the first predetermined frequency and the second predetermined frequency, then, using a combination of the first frequency and the second frequency to compute the distance to the target.

* * * * *